Patented June 7, 1938

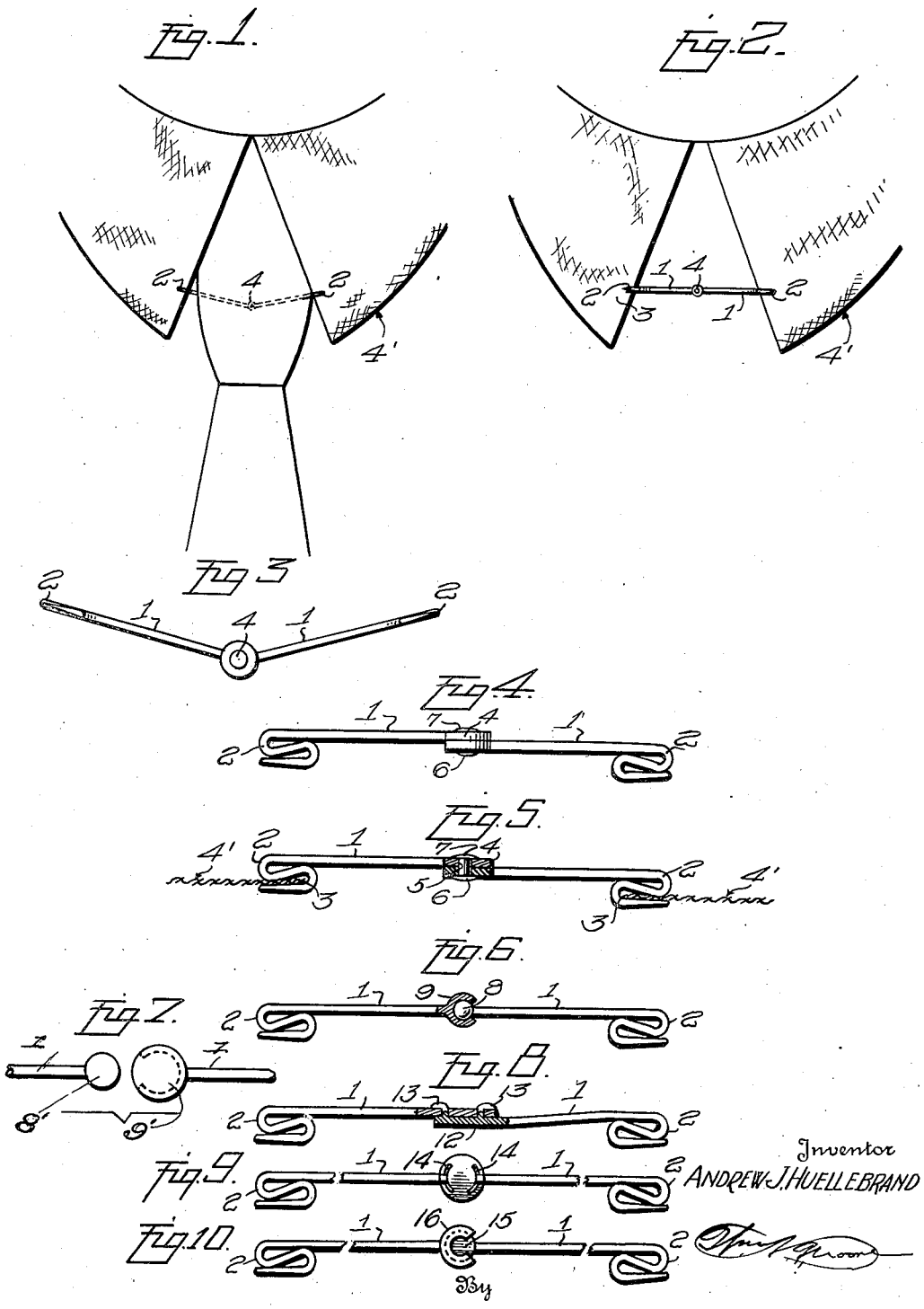

2,120,070

UNITED STATES PATENT OFFICE 2,120,070

COLLAR ADJUSTING DEVICE

Andrew J. Huellebrand, Nashville, Tenn., assignor to Swank Products, Inc., a corporation of Delaware Application June 22, 1936, Serial No. 86,626

2 Claims. (Cl. 24—81)

My invention relates to improvements in collar adjusting devices, and the main object of my invention is the provision of a device of this character which can be instantly applied to the collar and which will adjust and retain the collar in the desired position to insure comfort to the user the present application being a continuance in part of the application filed by me on September 12, 1935, Serial No. 40,315, allowed February 21, 1936.

Another object of my invention is the provision of a device of this character which will be of the simplest and cheapest possible construction to make the article an absolute necessity.

Another object of my invention is the provision of a collar adjusting device which will be of ornamental appearance, of small and compact size and which in every respect will prove efficient, desirable and practical.

With these objects in view my invention consists of a collar adjusting device embodying novel features of construction and combination of parts, substantially as described and claimed and as shown in the drawing, in which:

Figure 1 represents a front view of the collar and neck-tie with my device applied and shown in dotted lines.

Figure 2 represents a front view of the collar with my device applied and in extended position to show the manner of increasing the size of the collar.

Figure 3 represents a front view of the device shown on an enlarged scale.

Figure 4 represents a top plan or edge view of the device.

Figure 5 represents a view partly in elevation and section with the edges of the collar in engaged position, and Figures 6, 7, 8, 9 and 10 represent views in elevation with the important parts of my improvements shown in section and illustrating a series of modified forms of my improvement.

It will be understood that the soul of my invention resides in providing frictional contact between the inner ends of the two arms of my device to insure proper adjustment of the arms in their relation to the ends of the collar.

My invention as shown in Figures 1 to 5 is of the most simple and inexpensive construction and consists of a pair of arms 1, having each at its outer end the spring loop 2, which engages the edge 3, of the collar 4', and at their inner ends the arms are formed with heads or disks 4, having an opening 5, to receive the pin or stud 6, and this construction provides frictional contact between said heads or disks and when said arms are adjusted to make the collar the desired size the friction action holds the arms in the adjusted place which is the most important feature of this device.

It will be noted that the pin 6, is provided at each end with a head or enlargement provided with an inner flat face bearing upon the outer flat faces of the heads or disks 4, and thus the head on the pin serves to hold the inner opposed faces of the disk in frictional contact.

In the form of my invention shown in Figure 6, the pair of arms 1 are provided one with a ball 8, and the other with a socket 9. In the form shown in Figure 7, one arm is provided with a flat disk 8' and the other is provided with a socket 9', said flat disk 8' fitting in the socket 9' and providing a frictional joint or connection between the arms. In the forms of my invention shown in Figures 8 and 9, one arm is provided with a head 12, provided with hooks 13 passing through and movable in curved slots 14, providing a frictional hinge connection between the arms 1. In the form of my invention shown in Figure 10, one arm carries a flat disk 15, which fits in a curved ring socket 16 and which provides a frictional hinge connection between the pair of arms.

It will be observed that in all the forms of my invention the main and essential feature is the frictional joint or hinge between the arms at their inner ends which insures the retaining of the arms in their adjusted position in connection with the ends of the collar.

The many advantages of my device will be readily understood and appreciated and it will be evident that the device can be instantly applied and adjusted to make the collar fit to suit the size of the neck; that the device is neat and attractive in appearance; and the cost is so very small as to make its use highly desirable.

I claim:

1. A collar adjusting device, comprising a pair of similar members, means joining their inner ends in pivotal frictional relation with sufficient binding engagement to retain the members in adjusted position when moved from one position to another and withstanding the pull of a collar thereon, means included in said joining means for limiting movement of the members within a working range of movement, each member having a collar edge portion engaging means to retain the ends of the collar in desired position.

2. A collar adjusting device, comprising a pair of similar members, disks on the inner ends of said members engaging each other, one of said disks having slots therein and said other disk having fingers extending over the edges of the slots to hold the disks together in frictional engagement sufficient to hold the members in adjusted position and limit adjustment of the members, each member having a collar edge portion engaging means to retain the ends of the collar in desired position.

ANDREW J. HUELLEBRAND.